United States Patent

Kawai

Patent Number: 5,999,577
Date of Patent: Dec. 7, 1999

[54] CLOCK REPRODUCING CIRCUIT FOR PACKET FSK SIGNAL RECEIVER

[75] Inventor: Kazuo Kawai, Tokyo, Japan

[73] Assignee: General Research of Electronics, Inc., Tokyo, Japan

[21] Appl. No.: 08/878,973

[22] Filed: Jun. 19, 1997

[30] Foreign Application Priority Data

Nov. 29, 1996 [JP] Japan ..................... 8-334514

[51] Int. Cl.$^6$ .............. H03D 3/00; H04L 27/06; H04L 7/02
[52] U.S. Cl. ............ 375/334; 375/303; 375/360; 375/272; 329/300; 329/301; 329/302; 329/303
[58] Field of Search ............... 375/354, 359, 375/360, 362, 363, 272, 278, 269, 303, 323, 334, 273, 271, 223; 329/300, 301, 302, 303

[56] References Cited

U.S. PATENT DOCUMENTS

| | | | |
|---|---|---|---|
| 4,696,016 | 9/1987 | Rozema et al. | 375/293 |
| 5,175,544 | 12/1992 | McKeen | 341/52 |
| 5,267,267 | 11/1993 | Kazawa et al. | 375/294 |
| 5,539,784 | 7/1996 | Brauns et al. | 375/360 |
| 5,574,748 | 11/1996 | Vander Mey et al. | 375/204 |
| 5,644,600 | 7/1997 | Kawai | 375/286 |

Primary Examiner—Stephen Chin
Assistant Examiner—Michael W. Maddox
Attorney, Agent, or Firm—Trexler, Bushnell, Giangiorgi & Blackstone, Ltd.

[57] ABSTRACT

A circuit is provided by which in the case of the transmission of a short packet signal through an FSK transmission channel having a frequency error for transmission and reception, directly from one shaped rectangular pulse of a frequency detected bit synchronization signal having a DC offset (this pulse including a bias distortion as it is) a clock signal can be generated indicating the points of time when the base-band signal passes through its center level and the point of time when it arrives its maximum or minimum value (data sampling points of time). This invention utilizes the fact that the bit synchronization signal is in the form of a sine wave because it has been band limited. The sine wave including a DC offset is rectangularity shaped with respect to the zero axis as it is, and a counter is caused to start its counting operation by a raising-up or falling-down transition of this rectangular waveform and the count value of the counter is read out at the time of the falling-down or raising-up transition of the rectangular waveform. On the basis of the count value read out, the count values at a time when the base-band signal passed through its center level and the count value at a time when it arrives its maximum or minimum value (during the data section, a data sampling point of time) can be calculated directly. These calculated values are stored, and when the counter arrived these values, pulses are generated which are used to regenerate a clock.

4 Claims, 3 Drawing Sheets

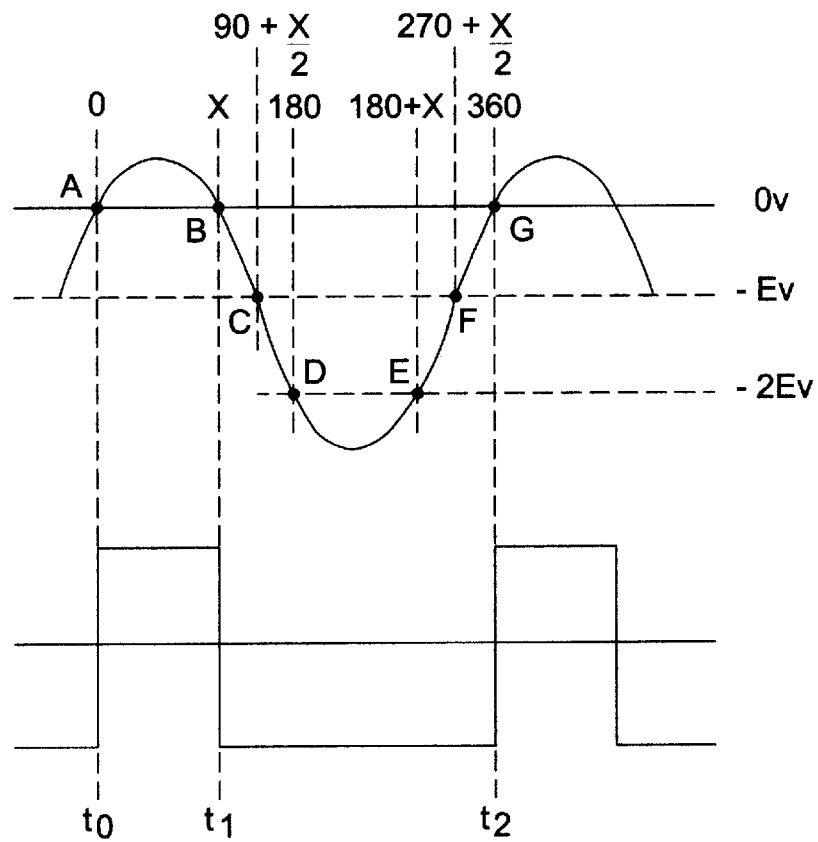
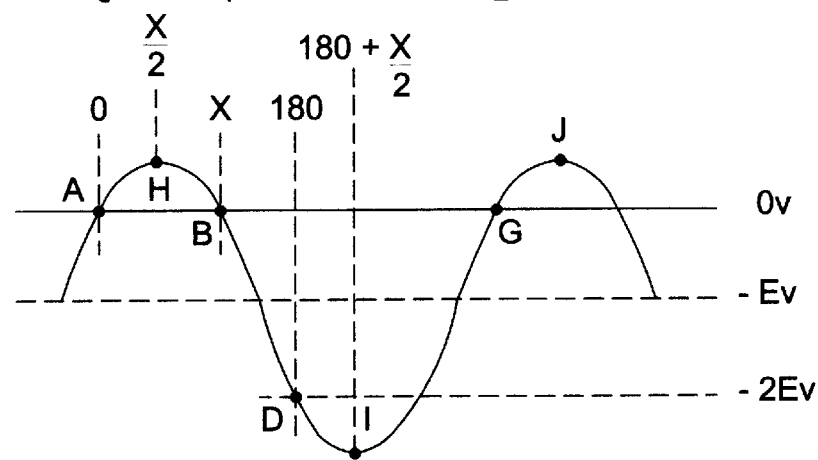
FIG.1a
FIG.1b
FIG.1c

CLOCK REPRODUCING CIRCUIT FOR PACKET FSK SIGNAL RECEIVER

BACKGROUND

This invention relates to a clock reproducing circuit constituting technique for reproducing a clock timing component from a demodulated base-band signal, which is adapted to be used in a packet FSK (Frequency Shift Keying) signal receiver.

A first prior art method of extracting a clock signal component from a received signal consists of squaring a demodulated base-band signal, and then passing the squared signal through a band-pass filter in order to extract a clock signal component therefrom. The clock signal component is then passed from the band-pass filter, to an analog or digital PLL (Phase Locked Loop) circuit, in order to produce a clock signal. However, in this method, because it takes some time for the band-pass filter and the PLL circuit to respond, the clock signal is not produced on time when the packet signal is short. In order to produce a clock signal in a shorter period of time, a second prior art method has been used. This second method consists of immediately starting a digital PLL circuit when the base-band signal crosses "zero" (a bit synchronization signal positioned at a head portion of the packet). Thereafter, while the data section of the packet has switched to the next cycle, a clock signal is produced by squaring a base-band signal and then passing the squared signal to a band-pass filter (this second prior art method provides smaller jitter compared to the first prior art method). Within the first prior art method, it is preferred that there not be produced any bias distortion (DC offset) since the clock signal is produced directly from the base-band signal. Because this method requires that the frequency error at the time of transmission and reception be extremely small, a high precision oscillator must be used during transmission and reception. When the frequency error is very small, it is possible to correct the frequency by using an A.F.C. (Automatic Frequency Control) circuit without using a high precision oscillator. However, it has not been possible to eliminate the high precision oscillator, and therefore reduce the size and cost of the resulting apparatus, when the frequency error has been large. As mentioned, in the past, using a high-pass filter to eliminate such a large DC offset has not been possible because it has taken too long to generate a clock signal.

A bit synchronization signal (an information signal consisting of alternately repeated "O's" and "1's") is limited in frequency band during transmission. If the data transmission rate is 9600 bps, a base-band sine wave of 4800 Hz is produced. Using the base-band sine wave, it is possible to eliminate any DC offset using a high-pass filter, such as a differentiation circuit. However, a phase shifting occurs, and this phase shifting must be adjusted.

This can be expressed mathematically as follows. If the value of a DC offset (which is on the basis of a frequency error) is intended to be represented using the angular frequency of a sine wave (the bit synchronization signal), an input signal becomes following equation (1):

$$I_{(s)} = \frac{a}{s} + \frac{b}{s^2 + b^2} \qquad (1)$$

where s is Laplace transform operator. Since the transformer functions of a differentiating circuit and phase shifting circuit can be expressed by s/(s+c) and (s−d)/(s+d), respectively, an output signal $O_{(s)}$ becomes the following equation (2):

$$O_{(s)} = \left(\frac{a}{s} + \frac{b}{s^2 + b^2}\right) \frac{s}{s+c} \frac{s-d}{s+d} \qquad (2)$$

This can be developed to partial fractions, as following equation (3):

$$O_{(s)} = \frac{A}{s+c} + \frac{B}{s+d} + \frac{C}{s+jb} + \frac{\overline{C}}{s-jb} \qquad (3)$$

In the equation (3), A, B and C are residues which are found by the substitution of the radicals of the respective denominators, $\overline{C}$ is the conjugate of C, and j is an imaginary unit. The first and second terms of equation (3) represent respective transient terms while the third and fourth terms are steady-state terms which represent sine waves. Therefore, the third and fourth terms of equation (3) need not be considered in the instant case. The inverse transform $O_{T(t)}$ of the first and second, transient, terms can be calculated indirectly using the following inverse transform equation (4):

$$O_{T(t)} = A\epsilon^{-ct} + B\epsilon^{-dt} \qquad (4)$$

In this equation (4), $\epsilon$ is the base of the naturalized logarithm. This exponential function is the above-mentioned transient, and in order that it can converge, the time is needed of about three times the respective reciprocal numbers of c and d, as is clear from the nature of an exponential function. Therefore, in order that the third and fourth, steady-state, terms (bit synchronization signal components) are available, the first and second transient, terms of the equation (3) must converge. This is the reason why prior art methods have required some time to generate a clock signal.

OBJECTS AND SUMMARY

Therefore, it is preferable that even though there is a DC offset on a demodulated base-band signal, correct timing information can be directly obtained therefrom. If such means for obtaining the correct timing information directly from the demodulated base-band signal were provided, it would be possible to produce a clock signal extremely quickly, since a DPLL (Digital Phase Locked Loop) can be started immediately when the correct timing information is obtained. By then controlling, for example, positive and negative peak-holding circuits or a sample/hold circuit by this clock signal, the offset value of a DC offset, or in the case of a FSK signal, a center frequency error, can be detected. In this manner, it is possible to correct frequency error.

As is clear from the above, it is an object of this invention to provide means for extracting a correct clock timing directly from a demodulated base-band signal (bit synchronization signal), which may include any DC offset.

In accordance with this invention, a bit synchronization signal, which is in the form of a sine wave and which may include a DC offset, is converted into a rectangular pulse waveform, which is in the form of a zero-crossing waveform directly corresponding to the sine waveform of the bit synchronization signal. A counter is started at the timing of a leading edge of the rectangular pulse, and a first count value is read out at the timing of a falling edge of the rectangular pulse. This first count value provides a base so that a second count value, at a time just when the base-band signal passes through the center level, can be calculated. A pulse is generated when the counter occupies the second count value, at the time just when the base-band signal passes through the center line. The second count value can be used to calculate a third count value at a time when the base-band signal occupies its maximum or minimum value (sampling point as a data signal). Then, a pulse may be generated when the counter reaches this third count value. With such structure, it is possible to obtain a clock timing directly from a bit synchronization signal even when it would include a DC offset.

Other objects, features and advantages of the invention will become apparent from a reading of the specification, when taken in conjunction with the drawings, in which like reference numerals refer to like elements in the views.

BRIEF DESCRIPTION OF THE DRAWINGS

FIG. 1 (a), (b) and (c) illustrate waveforms used to explain the operation of this invention;

DESCRIPTION

Figure 2A:
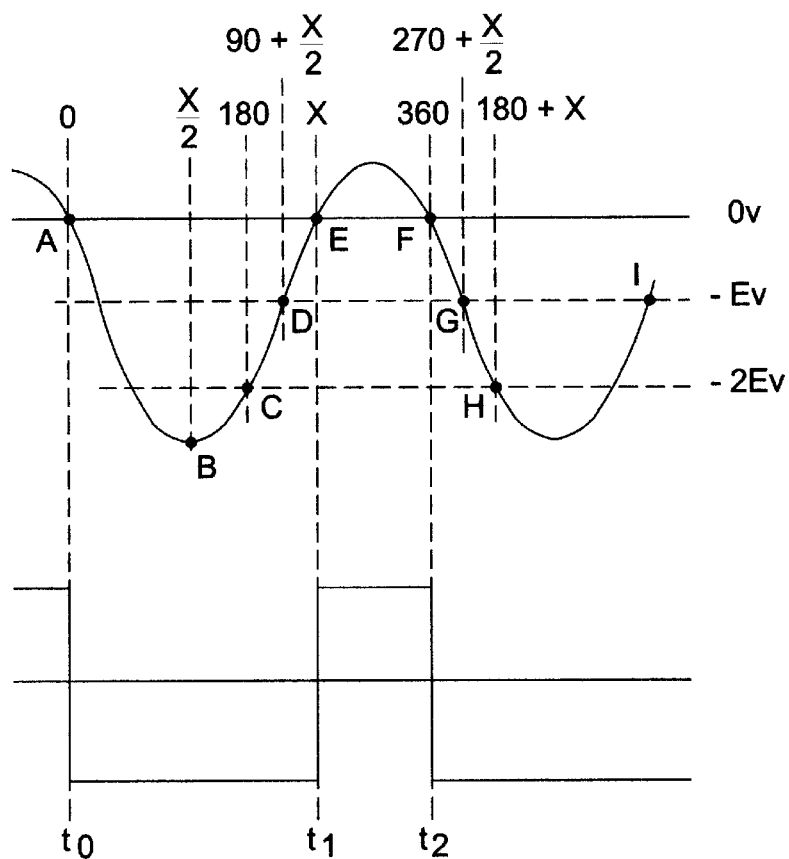
FIG. 2 (a), (b) and (c) illustrate additional waveforms, also used to explain the operation of this invention.

FIG. 1 shows various waveforms, and these waveforms are used to explain the principle of operation according to this invention and in order to provide the best understanding of the flowing of a signal through a circuit according to this invention. FIG. 1 (a) shows a waveform of a bit synchronization signal at the output of a frequency discriminator. Because of the existence of a frequency error in the bit synchronization signal, a frequency offset results, and is shown as −Ev. In the case where the modulation rate based on data is 9,600 bps, the shown sine wave will have a frequency of 4800 Hz. FIG. 1 (b) shows a rectangular waveform into which the waveform shown in FIG. 1 (a) has been shaped by a comparator using the comparison reference voltage of zero, or the like.

On the other hand, an oscillator is provided separately, of which output frequency is assumed to be 4,800 Hz×360= 1.72 MHz for giving simpler explanation. The oscillator output is adapted to be counted by a counter. The counter is started to carry out a counting operation at time $t_0$ corresponding to the time when the comparator output rectangular waveform as shown in FIG. 1 (b) raises up or causes a rising-up transition. It is also assumed that the counter counts values 360 in decimal notation (the value of the counter will be expressed using the decimal notation hereinafter) during the period of time from $t_0$ to $t_2$ (corresponding to the duration of one cycle of the 4,800 Hz sine wave). Then, it is defined that when the counter is caused to start its counting operation at time $t_0$, it counts first count value x at the time of $t_1$ when the rectangular waveform falls down or causes a falling-down transition. At point D which is a position when just a half cycle period lapsed from point A, the count value of the counter ought to be 180. Therefore, point E which is separated by x from point D has just a symmetrical relationship with point A with respect to center point C. Accordingly, when the count value of the half of 180+x which corresponds to point E was obtained, that is the counter reached 90+(x/2), the signal waveform ought to pass through point C which is just on the center level (in this case, the line of −Ev). Accordingly, as is clear from the description above, if the first counter value x can be obtained at time $t_1$, the point of time when the counter value which has been viewed reached the predetermined value of 90+(x/2), it becomes the time when the base-band signal just passes through the center level.

In the same manner, the counter value at point F in which position the base-band signal waveform passes through the center level in the raising-up direction is 270+(x/2) corresponding to the counter value of point C plus 180.

As will be clear from the above, the counter values corresponding to the center level of the base-band signal are 90+(x/2) and 270+(x/2).

Also, the counter value at the time when the base-band signal becomes its maximum value H and minimum value I are x/2 and 180+(x/2), respectively, as shown in FIG. 1 (c). The count value at point H cannot be known in a first cycle because x has not been yet found in this cycle, but if the value x/2 which was found in the first cycle has been stored in a memory, it can be applied at the point J in the next cycle. From this, the count values corresponding to the points of time of the maximum and minimum values are x/2 and 180+(x/2), respectively.

Figure 2B:
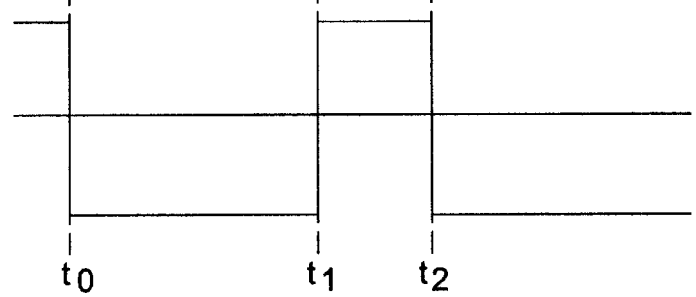
Figure 2C:
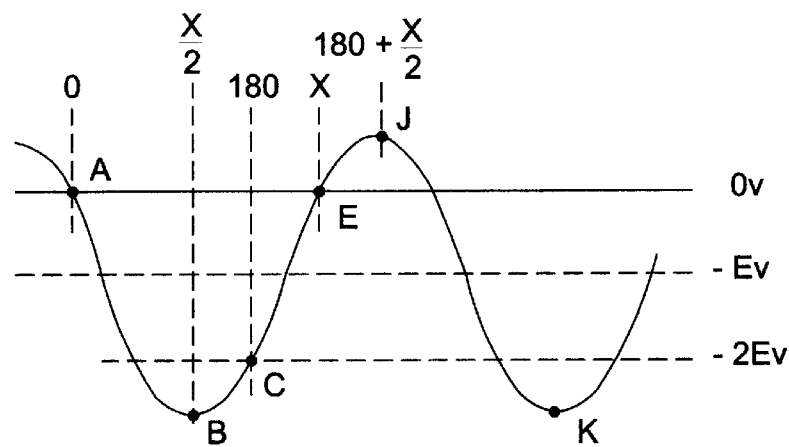

FIG. 2 shows similar views to those in FIG. 1, but it is a case when the counter is caused to start its counting operation at a falling-down transition of the rectangular waveform. Also, in this case, similarly to the case of FIG. 2, the count values corresponding to the center level are 90+(x/2) and 270+(x/2), and the count values are corresponding to the points of time of the maximum and minimum values are x/2 and 180+x/2, respectively.

Figure 3:
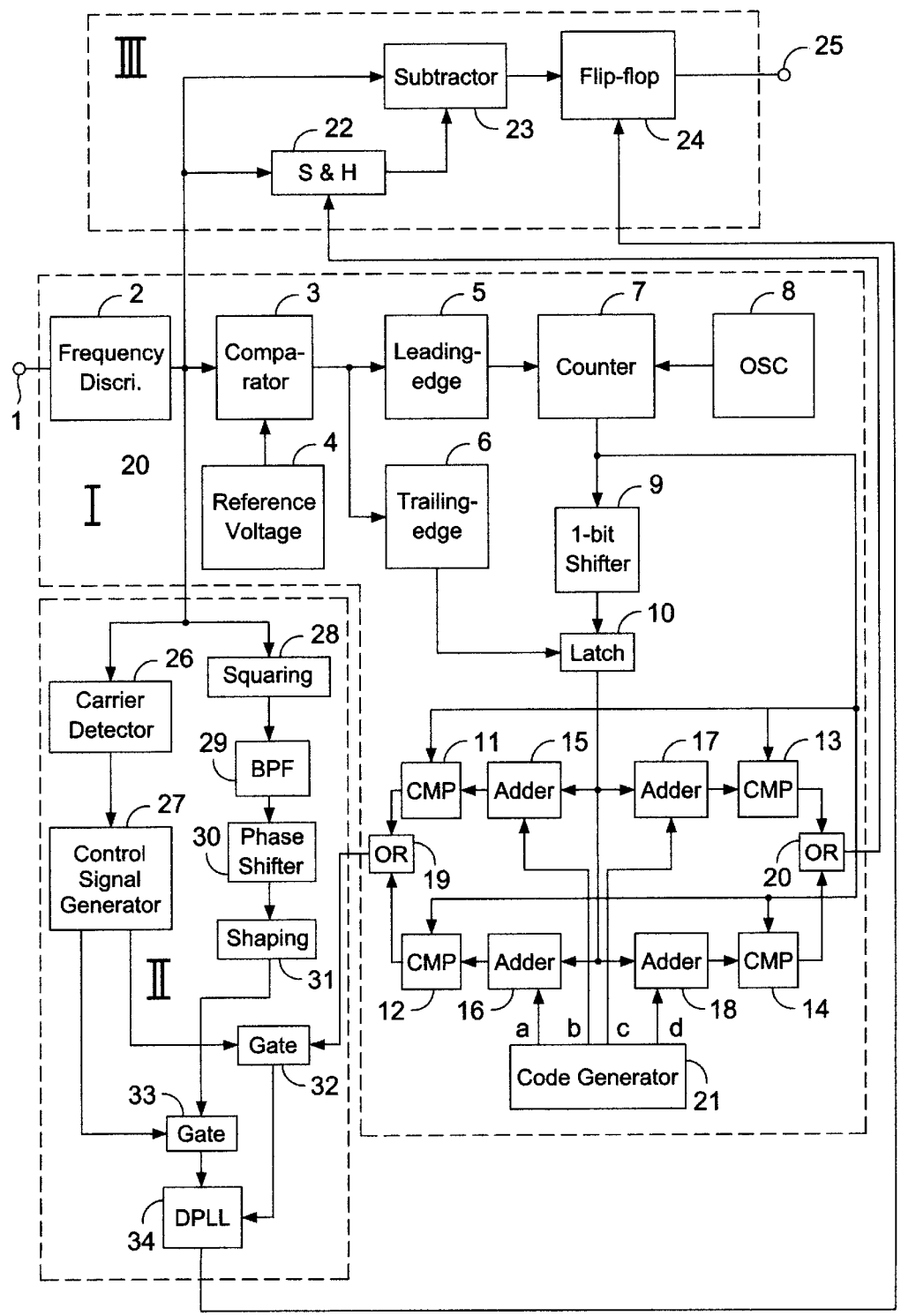
FIG. 3 illustrates a system circuit diagram including one embodiment according to the principal of this invention.

FIG. 3 is a block diagram including an embodiment circuit according to the above-mentioned principal of this invention. In this Figure, circuit positions I, II and III surrounded by respective dotted lines form a quick acting type clock reproducing circuit which constitutes the subject of this invention, a conventional type clock reproducing circuit and a demodulation correcting circuit, respectively, the latter two circuits being shown as mere samples for the use of the outputs of the circuit according to this invention, in an FSK signal receiver.

Reference numeral 1 identifies an IF (Intermediate Frequency) FSK signal input terminal. The IF signal is provided from an IF stage for an FSK signal receiver to which this invention can be applied, and is supplied to the quick acting typed clock reproducing circuit shown generally by I, especially to a frequency discriminator 2 in the circuit I. Therefore, a bit synchronization signal of the packet FSK signal applied to the input terminal 1 is frequency detected in the frequency discriminator 2 to be output therefrom as a base-band signal (which is assumed to be a sine wave of 4,800 Hz, coincidentally to the above-mentioned example). There would be included in the base-band signal a DC offset based on a frequency error. It is further assumed that this base-band signal is one having its wave form as shown in FIG. 1 (a). This signal is supplied to a level comparator 3 which compares it with a reference voltage (in this case, $O_v$) from a reference voltage generator 4, outputs a rectangular waveform as shown in FIG. 1 (b). The output signal from the comparator 3 is supplied to rising-up transition detector 5 which detects a raising-up transition of the rectangular waveform. A counter 7 is coupled to the rising-up transition detector 5 to be caused to start is operation by the timing signal from the detector 5 to be caused to start is operation by the timing signal from the detector 5 at the time of $t_0$ in FIG. 1 (b), for counting a frequency signal of 1.728 MHz from an oscillator 8. A count value from the counter 7 is coupled to a one-bit shifter 9 for shifting it by one bit in the lower order direction. Therefore, the one-bit shifter 9 provides an output which has been made into ½ in the decimal notation and is coupled to a latch circuit 10. The rectangular waveform from the comparator 3 is also supplied to a falling-down transition detector 6 so that a falling-down transition of the rectangular waveform is detected. The detected falling-down transition is also coupled to the latch circuit 10. In response thereto, the output from the one-bit shifter 9 is latched to the latch circuit 10 at the time of $t_1$ in FIG. 1 (b). Therefore, if the count value of the counter 7 is x at the time of $t_1$, the value of (x/2) is latched, this value being applied to four adders 15, 16, 17 and 18 commonly.

On the other hand, the embodiment circuit is provided with a code generator 21 having four output lines a, b, c and d which carry codes corresponding to 0, 180, 90 and 270 in the decimal notation, respectively, generated from the code generator 21. These codes 0, 180, 90 and 270 are coupled to the adders 16, 15, 17 and 18, respectively, and are added to (x/2) from the latch circuit, in the respective adders. The outputs from the adders 15, 16, 17 and 18 are applied to digital comparators (represented by CMP) 11, 12, 13 and 14, respectively, which receive the output of the counter 7, so that the adder outputs are compared with the counter output, respectively. The outputs of the comparators 11 and 12 are coupled to an OR circuit 19 so that the two inputs thereto are ORed, and the outputs of the comparators 13 and 14 are coupled to an OR circuit 20 so that they are ORed. Accordingly, a pulse is generated at the output of the comparator 19 at each time when the output of the counter 7 becomes (x/2) and 180+(x/2) (these points of time correspond to the time when the bit synchronization signal reached its positive and negative peak values), and also a pulse is generated at the output of the comparator 20 at each time when the output of the counter 7 becomes 90+(x/2) (these points of time correspond to the time when the bit synchronization signal passed through its center level).

With the construction as described above, it is possible to obtain pulses representative of the points of time when the bit synchronization signal passes through its center level, and pulses representative of the points of time when the positive and negative peaks of the bit synchronization signal arrive (these points of time being sampling points of time as a data signal). This enables the direct extraction of clock timing information from a bit synchronization signal which would include a DC offset, which is an intended object of this invention.

FIG. 3 also shows a clock reproducing circuit II with a conventional squaring/band-pass filtering/DPLL circuit. This includes a carrier detector 26, a control signal generator 27, a squaring circuit 28, a band-pass filter 29, a phase shifter 30, a shaping circuit 31, gate circuit 32 and 33, and a digital phase locked loop (DPLL) 34. When the carrier detector 26 coupled to receive the output of the frequency discriminator 2 detects the presence of the signal, it drives the control signal generator 27 so that the latter generates first and second output control pulses. These first and second control pulses are applied to the gates 32 and 33, respectively. First, the gate circuit 32 is made on in the response to the first control pulse so that a counter included in the DPLL 34 is reset by a peak-value arriving time indicating pulse at the output of the OR circuit 19. This counter can free-run thereafter, but unless oscillation accuracy within the DPLL is extremely deteriorated it is expectable that a state in which the DPLL counter has been made in its all zero condition whenever the peak indicating pulse was generated lasts for a considerably long time. Therefore, it is needed to perform switching to this normal mode so that the signal is permitted to take its data section within this period of time.

On the other hand, the operation of extracting a clock frequency component is carried out by the squaring circuit 28 and the band-pass filter 29, and for that operation it takes of some extent in order that is amplitude raises up, because Q of the band-pass filter has been set to a value from several tens to approximately 100. The output of the band-pass filter 29 is coupled to a phase shifter 30 so that is can be phase adjusted therein, and then coupled to the shaping circuit 31 for proving a rectangular waveform. When the amplitude of the band-pass filter output becomes a level which is sufficiently available, the gate circuit 33 is made on by the second control pulse from the control signal generator 27, whereby the DPLL 34 is driven in accordance with the output from the shaping circuit 31. This provides switching to a normal clock reproducing mode. At that time, the gate circuit 32 is indeed off. Therefore, the DPLL 34 can generate at is output a correct sampling pulse signal representative of sampling points of time for the base-band signal, which lasts from the initial portion of the bit synchronization signal to the end of its data section.

FIG. 3 also shows a DC offset correcting circuit III for the demodulated base-band signal. It includes a sample/hold circuit 22, a subtracter 23 and flip-flop circuit 24. As stated above, at the output of the OR circuit 20, a pulse is generated at the points of time when the bit synchronization signal passes through is center level. Therefore, if sampling is made for the base-band signal (the output frequency discriminator 2) in the sample/hold circuit 22 using this pulse, then a DC offset value can be obtained. Then, the voltage of this DC offset if held by the hold circuit portion of the circuit 22 and applied to the subtracter 23. The subtracter 23 also receives the base-band signal from the frequency discriminator 2 and subtracts from this base-band signal the offset value from the sample/hold circuit 22 so that it provides a correct base band-signal including no DC offset. The corrected base-band signal from the subtracter 23 is applied to the flip-flop 24 which is of a data type and is triggered by the sampling pulse signal at the output of DPLL circuit 34. Accordingly, the flip-flop circuit 24 can provide to a demodulated output terminal 25 a demodulated output which has been shaped into a rectangular waveform signal.

As has been explained in detail, with this invention, it is possible to reproduce clocks indicating the points of time when the base band signal passes through its center level and the points of time when the base-band signal arrives its positive and negative peaks directly from a rectangular pulse obtained by rectangularly shaping the bit synchronization signal with respect to the zero axis as it is, even though the base-band signal has included a DC offset caused by a frequency error, or the like. Therefore, using these clocks, it is possible to demodulate correctly a signal having a short packet length from its start position.

While there has been shown and described a preferred embodiment, it is to be understood that various other adaptations and modifications may be made within the spirit and scope of the invention.

The invention claimed is:

1. A clock reproducing circuit for a packet FSK signal receiver said clock reproducing circuit comprising:

means for shaping a frequency detected bit synchronization signal into a rectangular waveform having a plurality of cycles;

a frequency oscillator for generating a signal having a frequency of K/2 of a modulation rate, wherein K is a variable;

a counter for counting the frequency of said signal generated by said frequency oscillator, wherein said counter is caused to start a counting operation at a point of time of a raising-up or falling-down transition of a cycle of said rectangular waveform, wherein said counter is caused to continue said counting operation until a point of time of a raising-up or a falling-down transition in a next cycle of said rectangular waveform, whereupon said counter is caused to start another counting operation, wherein a value of said counter corresponds to a maximum or minimum value of the bit synchronization signal when 360/K equals x/2 or 180+(x/2) and a second value of said counter corresponds to a center level passing-through point of the bit synchronization when 360/K equals 90+(x/2) or 270+(x/2), where said counter values of the counter at a time of a falling-down or raising-up transition of said rectangular waveform are expressed in the decimal notation as x; and means for generating a pulse in response to at least one of said counter values.

2. The clock reproducing circuit of claim 1, further comprising:

means for providing a value corresponding to a counter value of x/2;

means for providing values corresponding to counter values of 0, 180, 90 and 270;

means for adding said counter value of x/2 to each of said counter values of 0, 180, 90 and 270; and means for comparing the added values x/2, 180+(x/2) and 270+(x/2) with an output of said counter to determine when to generate said clock pulses.

3. The clock reproducing circuit of claim 2, further comprising a first OR circuit receiving the added values of x/2 and 180+(x/2) for providing an output indicating points of time when the bit synchronization signal arrives its positive and negative peaks, respectively; and a second OR circuit receiving the added values of 90+(x/2) and 270+(x/2) for providing an output indicating points of time when the bit synchronization signal passes through its center level.

4. A clock producing circuit for a packet FSK signal receiver, said clock reproducing circuit comprising:

means for shaping a frequency detected bit synchronization signal into a rectangular waveform;

a counter for using said rectangular waveform to count a first value corresponding to a time when said bit synchronization signal crosses a center level and a second value corresponding to a time when said bit synchronization signal reaches a maximum or minimum value; and pulse generating means for generating clock pulses upon said counting means having counted said first and second values, whereby said clock producing circuit produces a clock pulse from said bit synchronization signal using said rectangular waveform.

* * * * *